(12) United States Patent
Ross et al.

(10) Patent No.: US 9,751,153 B2
(45) Date of Patent: Sep. 5, 2017

(54) EFFORT MODULATION FOR PROCESS CONTROL OF FRICTION STIR OPERATIONS

(71) Applicant: Brigham Young University, Provo, UT (US)

(72) Inventors: Kenneth Alec Ross, Mishawaka, IN (US); Carl D. Sorensen, Provo, UT (US)

(73) Assignee: Brigham Young University, Provo, UT (US)

( * ) Notice: Subject to any disclaimer, the term of this patent is extended or adjusted under 35 U.S.C. 154(b) by 147 days.

(21) Appl. No.: 13/853,798

(22) Filed: Mar. 29, 2013

(65) Prior Publication Data

US 2014/0207274 A1    Jul. 24, 2014

Related U.S. Application Data

(60) Provisional application No. 61/618,266, filed on Mar. 30, 2012, provisional application No. 61/769,920, filed on Feb. 27, 2013.

(51) Int. Cl.
*B23K 20/12* (2006.01)

(52) U.S. Cl.
CPC ............... *B23K 20/1235* (2013.01)

(58) Field of Classification Search
None
See application file for complete search history.

(56) References Cited

U.S. PATENT DOCUMENTS

| | | | | |
|---|---|---|---|---|
| 5,460,317 | A * | 10/1995 | Thomas et al. | 228/112.1 |
| 7,080,770 | B2 * | 7/2006 | Lovin | B23K 20/12 228/102 |
| 2004/0129763 | A1 * | 7/2004 | Burford et al. | 228/112.1 |
| 2005/0006441 | A1 * | 1/2005 | Adams et al. | 228/114.5 |
| 2005/0051602 | A1 * | 3/2005 | Babb et al. | 228/112.1 |
| 2009/0255980 | A1 * | 10/2009 | Li et al. | 228/102 |
| 2010/0072261 | A1 * | 3/2010 | Cruz et al. | 228/102 |
| 2010/0078462 | A1 * | 4/2010 | Babb et al. | 228/102 |

* cited by examiner

*Primary Examiner* — Sean Shechtman
(74) *Attorney, Agent, or Firm* — Brake Hughes Bellermann LLP

(57) ABSTRACT

A system and method for making adjustments to output effort from a spindle driver using a multi-stage nested control loop of an active controller to provide constant power to a friction stir zone during a friction stir operation. Providing constant power facilitates temperature control within the friction stir zone and thereby improves the result of the operation such as a weld.

18 Claims, 17 Drawing Sheets

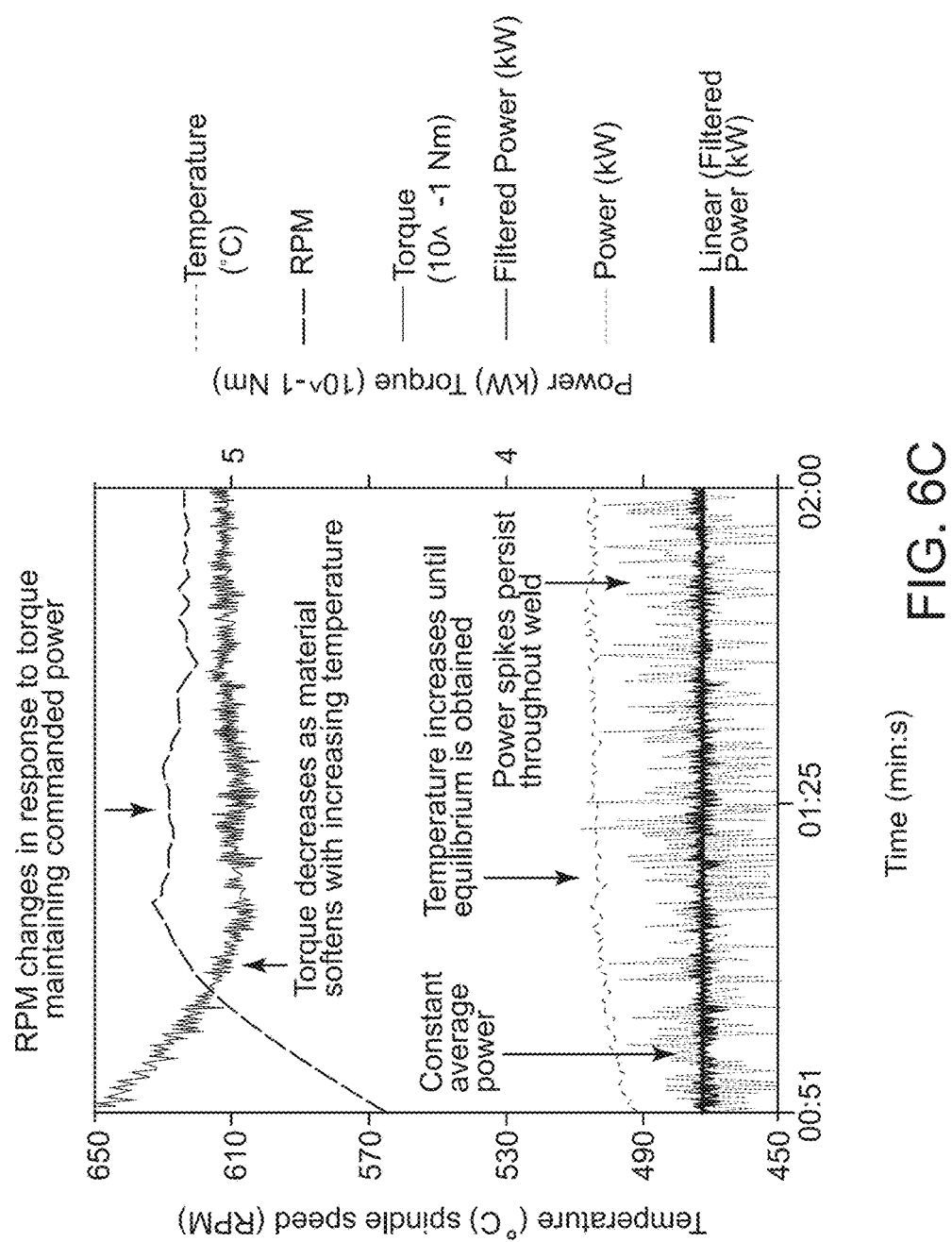

EFFORT MODULATION FOR PROCESS CONTROL OF FRICTION STIR OPERATIONS

RELATED APPLICATIONS

This application claims priority to U.S. Provisional Application 61/618,266 entitled "TORQUE MODULATION FOR PROCESS CONTROL OF FRICTION STIR PROCESSING" filed on 30 Mar. 2012 for Kenneth Alec Ross and Carl D. Sorensen and to U.S. Provisional Application 61/769,920 entitled "EFFORT MODULATION FOR PROCESS CONTROL OF FRICTION STIR PROCESSING" filed on 27 Feb. 2013 for Kenneth A. Ross et al. Each of the foregoing applications are incorporated herein by reference in their entirety.

BACKGROUND OF THE INVENTION

Field of the Invention

This invention relates generally to friction stir operations such as friction stir welding (FSW), friction stir processing (FSP), friction stir mixing (FSM), friction surfacing, friction hydro pillar processing, friction stir forming, friction extrusion, and friction stir spot welding (FSSW) (and hereinafter referred to collectively as "friction stir operations"). More specifically, the present invention relates to the use of control algorithms that utilize control of effort (e.g. torque) in order to improve control of the friction stir operations.

Description of Related Art

Friction stir welding is a technology that has been developed for welding metals and metal alloys. The FSW process often involves engaging the material of two adjoining workpieces on either side of a joint by a rotating stir pin. Force is exerted to urge the pin and the workpieces together and frictional heating caused by the interaction between the pin, shoulder and the workpieces results in plasticization of the material on either side of the joint. The pin and shoulder combination or "FSW tip" is traversed along the joint, plasticizing material as it advances, and the plasticized material left in the wake of the advancing FSW tip cools to form a weld. The FSW tip can also be a tool without a pin but only a shoulder for processing of another material through FSP.

FIG. 1 is a perspective view of a tool being used for friction stir welding that is characterized by a generally cylindrical tool 10 having a shank 8, a shoulder 12 and a pin 14 extending outward from the shoulder. The pin 14 is rotated against a workpiece 16 until sufficient heat is generated, at which point the pin of the tool is plunged into the plasticized workpiece material. Typically, the pin 14 is plunged into the workpiece 16 until reaching the shoulder 12 which prevents further penetration into the workpiece. The workpiece 16 is often two sheets or plates of material that are butted together at a joint line 18. In this example, the pin 14 is plunged into the workpiece 16 at the joint line 18.

FIG. 2 is a cross-sectional view of a typical tool 10, but should not be considered as limiting. A collar 22 is shown gripping both the shank 8 and the FSW tip 24, wherein the FSW tip is comprised of the shoulder 12 and the pin 14. As the tool 10 is rotated, torque (i.e. effort) is transmitted from the rotating shank 8 to the collar 22 and then to the FSW tip 24.

Referring to FIG. 1, the frictional heat caused by rotational motion of the pin 14 against the workpiece material 16 causes the workpiece material to soften without reaching a melting point. The tool 10 is moved transversely along the joint line 18, thereby creating a weld as the plasticized material flows around the pin 14 from a leading edge to a trailing edge. The result is a solid phase bond 20 at the joint line 18 that may be generally indistinguishable from the workpiece material 16 itself, in contrast to welds using other conventional technologies. It is also possible that the solid phase bond 20 is superior to the original workpiece material 16 because of the mixing that occurs. Furthermore, if the workpiece material is comprised of different materials, the resulting mixed material may also be superior to either of the two original workpiece materials.

It is observed that when the shoulder 12 contacts the surface of the workpieces, its rotation creates additional frictional heat that plasticizes a larger cylindrical column of material around the inserted pin 14. The shoulder 12 provides a forging force that contains the upward metal flow caused by the rotating tool pin 14.

During friction stir welding, the area to be welded and the tool 10 are moved relative to each other such that the tool traverses a desired length of the weld joint. The rotating friction stir welding tool 10 provides a continual hot working action, plasticizing metal within a narrow zone as it moves transversely along the workpiece materials 16, while transporting metal from the leading edge of the pin 14 to its trailing edge. As a weld zone cools, there is typically no solidification as no liquid is created as the tool 10 passes. It is often the case, but not always, that the resulting weld is a defect-free, recrystallized, fine grain microstructure formed in the area of the weld.

Travel speeds of friction stir tools change depending upon the specific type of friction stir operation being performed, the application and the material being processed. Some examples of travel speeds are over 1 m/min with rotation rates of 200 to 3000 rpm. These rates are only examples and should not be considered to be limiting the operation of the present invention. Temperatures reached are usually close to, but below, solidus temperatures. Friction stir welding parameters are a function of a material's thermal properties, high temperature flow stress and penetration depth.

Friction stir welding has several advantages over fusion welding because 1) there is no filler metal, 2) the process can be fully automated requiring a relatively low operator skill level, 3) the energy input is efficient as all heating occurs at the tool/workpiece interface, 4) minimum post-weld inspection is required due to the solid state nature and extreme repeatability of FSW, 5) FSW is tolerant to interface gaps and as such little pre-weld preparation is required, 6) there is typically no weld spatter to remove, 7) the post-weld surface finish can be exceptionally smooth with very little to no flash, 8) there is often no porosity and oxygen contamination, 9) there is little or no distortion of surrounding material, 10) no operator protection is required as there are no harmful emissions, and 11) weld properties are often improved. Throughout this document, friction stir operations will be considered to include all processes that can be performed using a friction stir tool, including but not limited to friction stir welding, friction stir processing, friction stir spot welding and friction stir mixing.

In friction stir welding, the temperature of the process zone or friction stir zone affects the properties of the resulting weld and has a dramatic effect on tool life such as in PCBN (polycrystalline cubic boron nitride) tools. This tool example should not be considered to be limiting. An active control system that changes process parameters to control weld temperature is desirable.

Controlling the weld temperature throughout the length of the weld is an important undertaking because weld properties, such as fracture toughness and corrosion resistance, vary with weld temperature. If specified properties are desired throughout the weld, the weld temperature must be adjustable and in control throughout the length of the weld.

The short tool life of PCBN tools limits the application of friction stir processing (FSP) in steels and other high softening temperature (or high melting temperature) materials. Controlling tool temperature should increase the tool life of PCBN tools because some temperature problems can cause damage. For example, if the temperature is too low, the tool is overstressed by forces that increase as tool temperature decreases. In contrast, if the tool temperature is too high, PCBN tools fail quickly because of chemical wear. High temperature can also cause creep in the locking collar allowing the PCBN insert to rotate. Point stresses will then likely exist at the corners of the insert on cooling that may lead to cracking and failure.

The first efforts to control weld temperature used passive control techniques. Researchers considered that the weld temperature was proportional to weld pitch (spindle speed)/ (travel speed) or various "pseudo heat indexes" which are functions of spindle speed and travel speed. Passive control techniques assume that the process has reached a self-limiting equilibrium condition.

Passive control techniques are not adequate for temperature control because equilibrium conditions may not exist along the length of a weld. Causes of temperature changes along the length of the weld include: inadequate cooling of the tool or backing plate; changes in the thermal boundary condition; and insufficient time to reach equilibrium. Passive control techniques are not versatile because they do not adjust for process disturbances.

FIG. 3 is a block diagram of an active control system for a friction stir welding machine. A friction stir welding machine includes a friction stir welding tool that is coupled to a spindle, which in turn is coupled to a spindle motor. The friction stir welding machine also includes a surface for clamping or supporting workpieces to be friction stir welded. A friction stir welding machine can be controlled by the active control system to thereby perform friction stir welding.

FIG. 4 shows that the prior art also teaches a two-stage control model that contains an inner loop that controls the spindle speed to keep power constant and an outer loop for setting the desired power based on weld temperature. FIG. 4 is a block diagram showing a close-up of the inner loop of FIG. 3.

FIG. 3 shows a temperature control algorithm where T is temperature, w is spindle speed, M is torque and P is power.

FIG. 5 is provided as a block diagram of a close-up view of a stir zone from FIGS. 3 and 4. A plant is the combination of the spindle motor and the stir zone. For the outer loop the reference is desired temperature, the controlled variable is temperature and the manipulated variable is power. For the inner loop the reference is commanded power and the controlled variable is power.

The prior art shown in FIG. 3 teaches that the inner loop adjusts spindle speed to maintain constant power. It is critical to the present invention to understand this aspect of the prior art. The purpose of the inner loop is to maintain a desired power provided to the stir zone.

The relationship between power and spindle speed is given by:

$$P = \omega M \quad \text{Equation (1)}$$

where P is power, ω is spindle speed in radians/s and M is torque. Power control by adjusting spindle speed uses torque feedback and Equation (1) to solve for the spindle speed required to produce the desired power. A block diagram for power control by adjusting spindle speed is shown in FIG. 4 where M(filtered) is the filtered value of the reported torque. This control scheme assumes that torque is constant during each PLC time step. Slew limits define the maximum acceleration of the spindle. Slew limits are used to prevent the system from going unstable due to noise in torque feedback. If slew limits are set too high, the system will amplify noise in the torque feedback and become unstable.

Results for power control by adjusting spindle speed with a slew rate of 0.83 RPM/s are shown in FIG. 6C. When power control is enabled, the torque is high and the RPM is low. As the weld progresses the plate heats and softens causing a decrease in torque. As torque decreases, the RPM increases, thereby maintaining constant power. Large spikes in power persist throughout the weld as shown. Power spikes occur because the spindle motor attempts to accelerate the spindle instantaneously to achieve the commanded RPM. Adjusting spindle speed to control power results in large power spikes throughout the weld. The average of these power spikes is the desired power value.

It would be an advantage over the prior art to provide an improved active control system that does not use spindle speed to control power.

BRIEF SUMMARY OF THE INVENTION

The present invention is a system and method for making adjustments to effort from a spindle driver in order to provide constant power to a friction stir zone during friction stir operations and control the temperature within the friction stir zone and thereby improve the weld or other result of the friction stir operations. In certain embodiments, a commanded or requested power is obtained by modulating the effort variable in response to the flow variable feedback. The flow feedback variable may be measured or estimated.

Furthermore, as disclosed herein, a friction stir system for controlling power provided to a friction stir zone during friction stir operations may include a friction stir tool, a spindle that is coupled to the friction stir tool, a spindle driver that is coupled to the spindle to thereby cause the friction stir tool to rotate and an active controller for controlling operation of the friction stir tool, wherein the active controller adjusts an output effort of the spindle driver that is used to drive the friction stir tool to thereby control power provided to a friction stir zone.

A corresponding method for using an active controller to control the temperature of a weld during friction stir operations may include providing an active controller for controlling operation of a friction stir tool, controlling power input by the friction stir tool to a friction stir zone using the active controller to control a temperature of the friction stir zone, wherein the power input is controlled by making adjustments to an output effort of a spindle driver that is used to drive the friction stir tool.

These and other objects, features, advantages and alternative aspects of the present invention will become apparent to those skilled in the art from a consideration of the following detailed description taken in combination with the accompanying drawings.

BRIEF DESCRIPTION OF THE DRAWINGS

FIG. 6C is a graph showing power control by adjusting spindle speed;

DETAILED DESCRIPTION OF THE INVENTION

Figure 1:
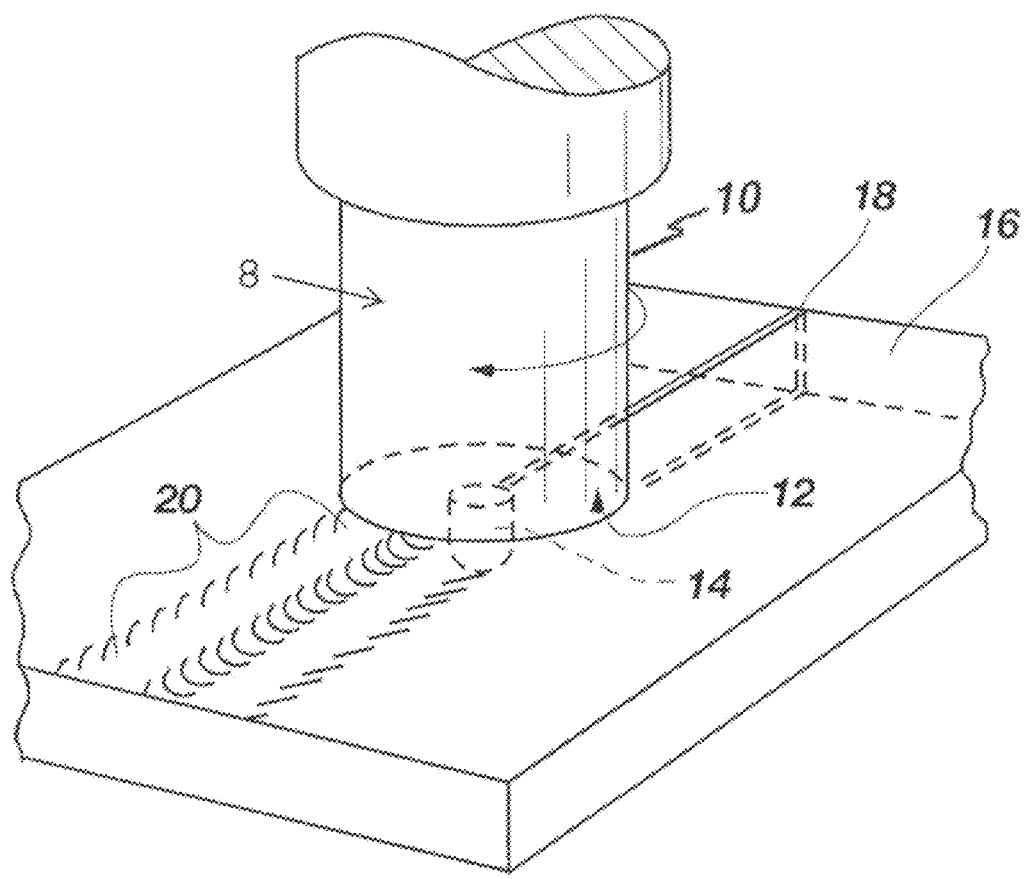
FIG. 1 is a perspective view of a tool as taught in the prior art for friction stir welding.
Figure 2:
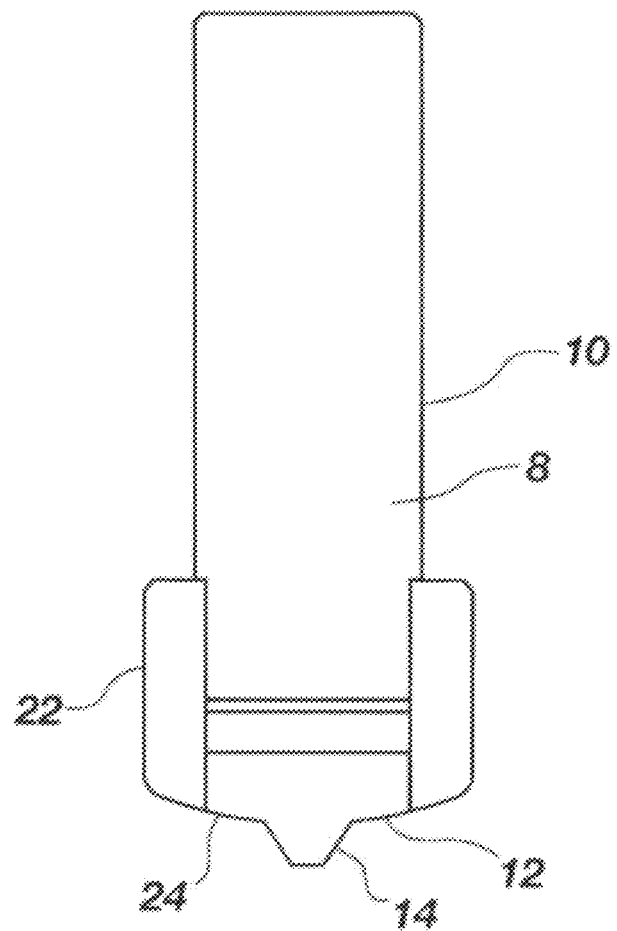
FIG. 2 is a cut-away profile view of an FSW tip, a locking collar and a shank from the prior art.
Figure 3:
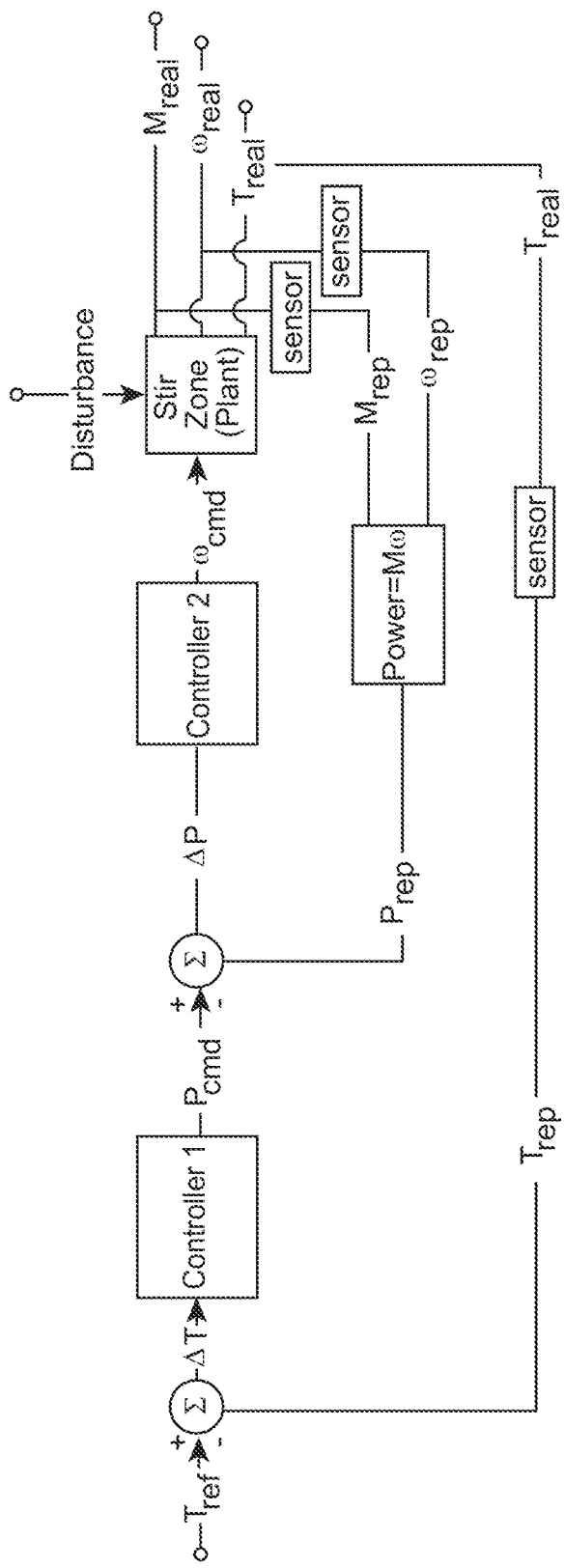
FIG. 3 is simplified block diagram for an active control system for temperature control as taught in the prior art.
Figure 4:
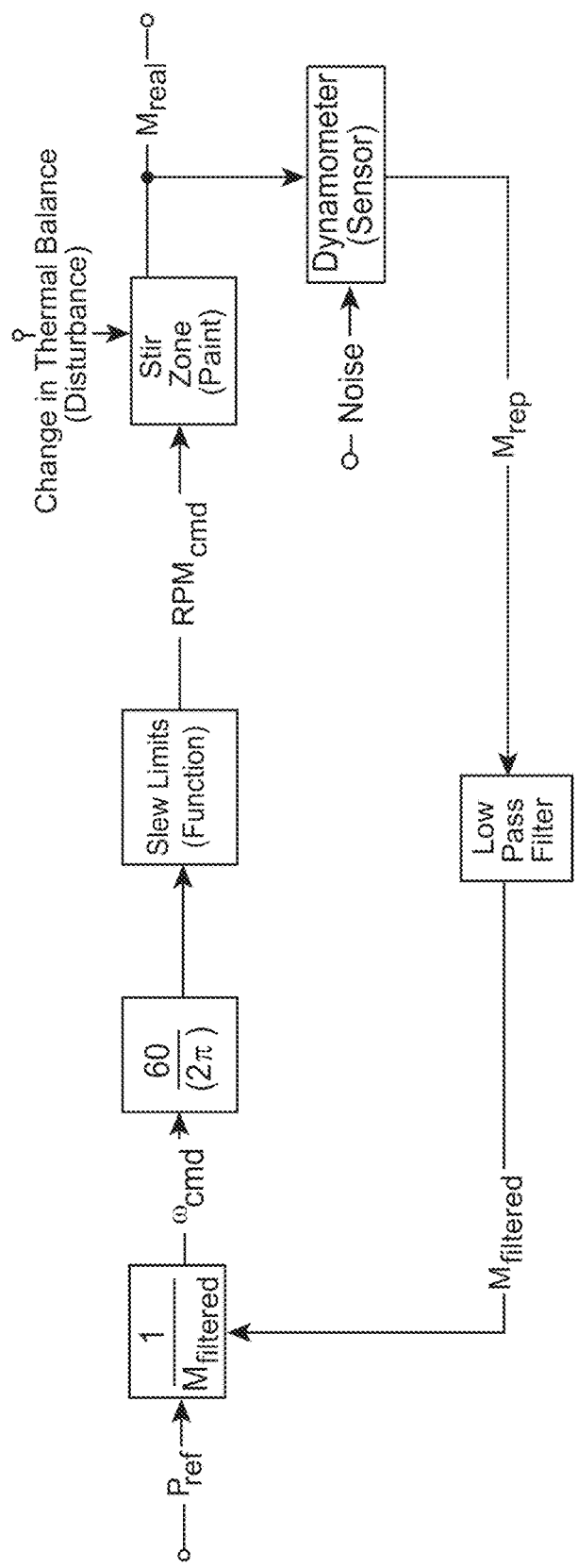
FIG. 4 is a block diagram for a spindle speed power control system as taught in FIG. 3.
Figure 5:
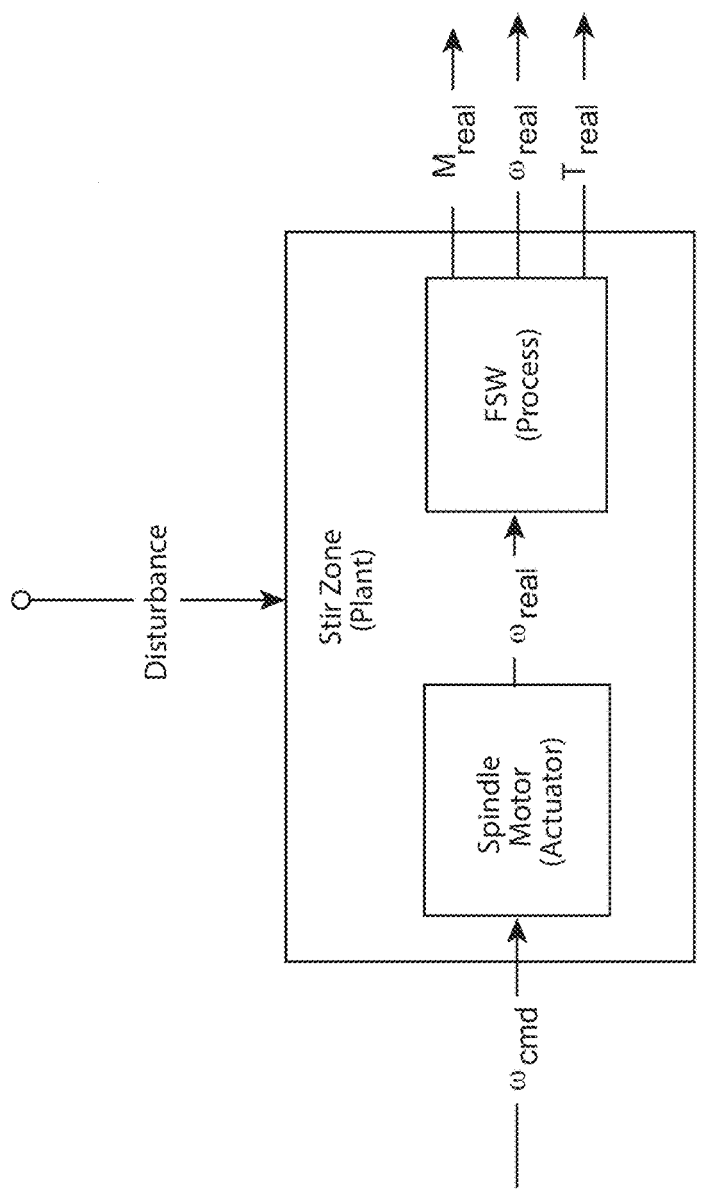
FIG. 5 is a block diagram for a close-up of a plant for a control model of the prior art.

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

As disclosed herein, the effort of a friction stir system is modulated based on flow feedback. Based on the principle of system similarity in system dynamics a power, P, is defined as an effort, e, multiplied by a flow, f. This relationship is shown in Equation (2) as:

$$P = e * f \quad (2)$$

For example, power in the mechanical rotation domain is defined by torque (effort) multiplied by angular velocity (flow). Examples of various power domains, efforts and flows are shown in Table 1 below.

TABLE 1

| Power domains | | |
|---|---|---|
| Domain | Effort (e) | Flow (f) |
| Mechanical (translation) | Force F [N] | Velocity v [m/s] |
| Mechanical (rotation) | Torque M [Nm] | Angular velocity ω [rad/s] |
| Pneumatic | Pressure p [Pa] | Volume Flow Q [m³/s] |
| Hydraulic | Pressure p [Pa] | Volume Flow Q [m³/s] |
| Electric | Voltage u [V] | Current i [A] |
| Magnetic | Magnetomotive force | Flux rate |

One method of modulating output effort of the spindle driver includes modulating the input flow or effort of the spindle driver. If the spindle driver is a transformer, output effort can be effectively modulated by modulating input effort. If the spindle driver is a gyrator, output effort can be effectively modulated by modulating input flow. For example, an electric motor driver is a gyrator. The input flow (e.g. current) can be used to modulate the output effort (torque).

This detailed description discloses specific examples that demonstrate controlling an electric spindle motor. Electric motors perform a transformation from the electrical domain, through the magnetic domain to the rotational mechanical domain. In particular, for an electric motor the output torque is controlled by means of adjusting the input current. A device that transforms effort in one domain to flow in another domain, or vice versa, is known as a gyrator. Many devices that provide spindle energy are gyrators. Although the electric spindle motor is a representative embodiment, the invention is not limited to such embodiments. For example, the power of a friction stir system could be controlled by monitoring any form of flow (including those presented in Table 1) and modulating any form of effort (including those presented in Table 1).

As used herein, the "temperature" of the friction stir zone refers to any direct measurements or estimated measurements and may include any useful method of measuring or approximating weld (i.e. friction stir zone) temperature. For example the friction stir zone temperature may be approximated by measured tool temperature or backing plate temperature. Methods to measure the internal temperature of the friction stir operation zone, such as ultrasonic technology, may also be used.

Figure 6A:
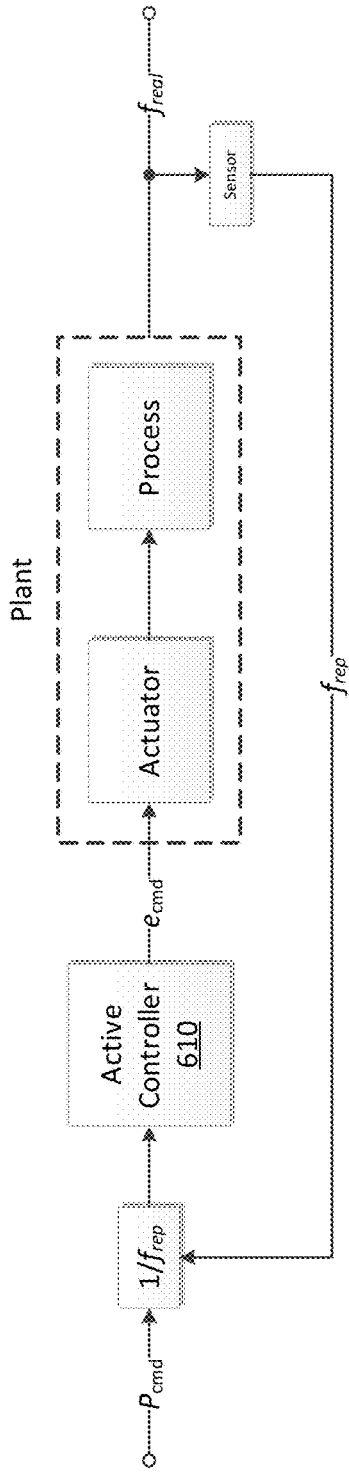
FIGS. 6A and 6B are system block diagrams depicting power control via modulation of effort.
Figure 6B:
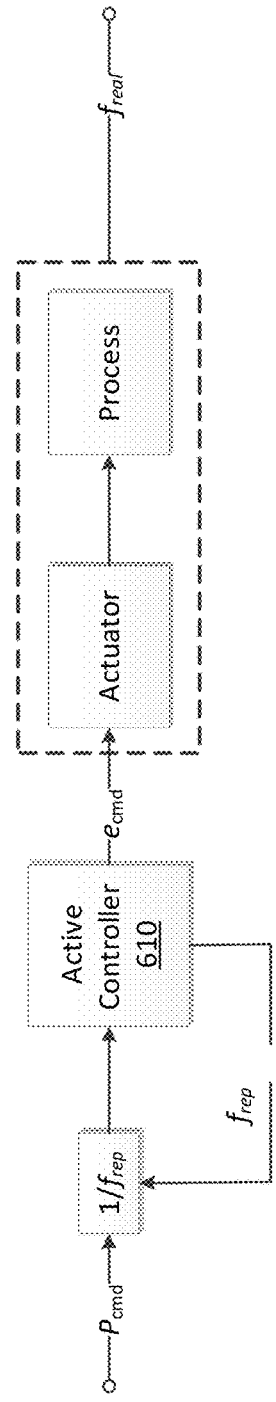

System diagrams depicting power control via modulation of effort by an active controller 610 are shown in FIG. 6A and FIG. 6B where $P_{cmd}$ is commanded power, $f_{rep}$ is reported flow, $f_{real}$ is real flow and $e_{cmd}$ is commanded effort. It is important to note the reported flow may be a measured value or an estimated value. FIG. 6A shows reported flow as a measured value while FIG. 6B shows reported flow as an estimated value. One of skill in the art will appreciate that there are a variety methods of providing reported flow and that FIG. 6A and FIG. 6B are examples for reference only.

The present invention is an improved control system for friction stir operations. Research shows that power provided to a friction stir zone leads tool temperature. Due to the inertia associated with the spindle, power control is best achieved by commanding torque (i.e. effort) rather than spindle speed (i.e. flow) as will be explained.

The active control system disclosed herein was initially developed for a dual loop control system for FSW where the inner loop maintains constant power and the outer loop adjusts power to maintain constant temperature. Although much of the operation of the present invention as described herein refers to a dual loop control system for controlling welding operations, the invention is not limited to a dual loop control system nor to welding operations.

Figure 7:
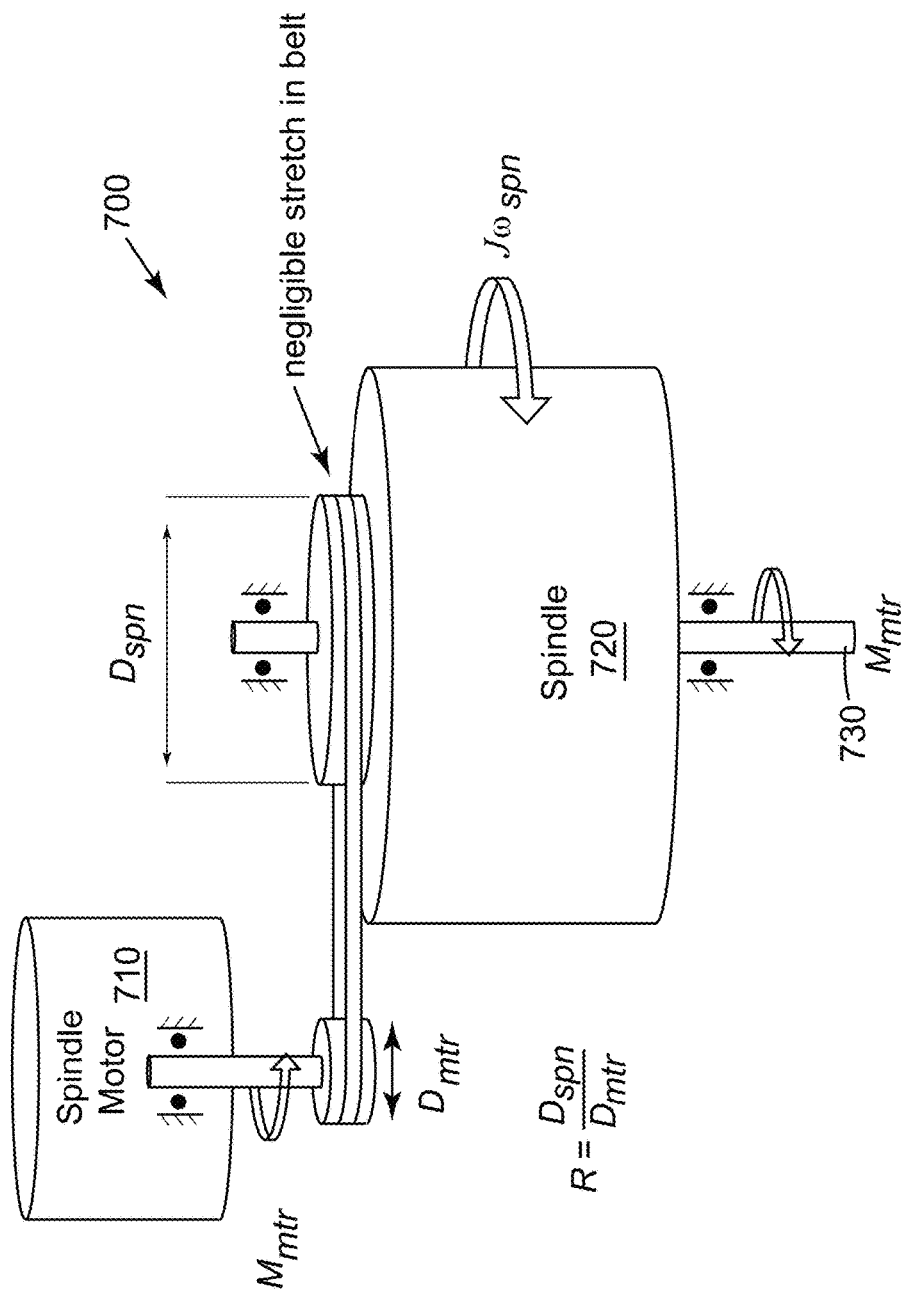
FIG. 7 shows that constant spindle speed welds contain variation in power and temperature.

FIG. 7 is provided to show the hardware elements 700 of a friction stir welding system that are relevant to an understanding of the present invention. These elements include a spindle motor 710 that is part of a friction stir welding machine (not shown). The spindle motor 710 is coupled to a spindle 720. The spindle in turn is coupled to a friction stir welding tool 730 that is used to perform friction stir welding in all its various forms and on both low melting temperature and high melting temperature materials. There are various configurations of friction stir welding tools and this document should not be seen as limiting the variety that can be used with the present invention.

Figure 8:
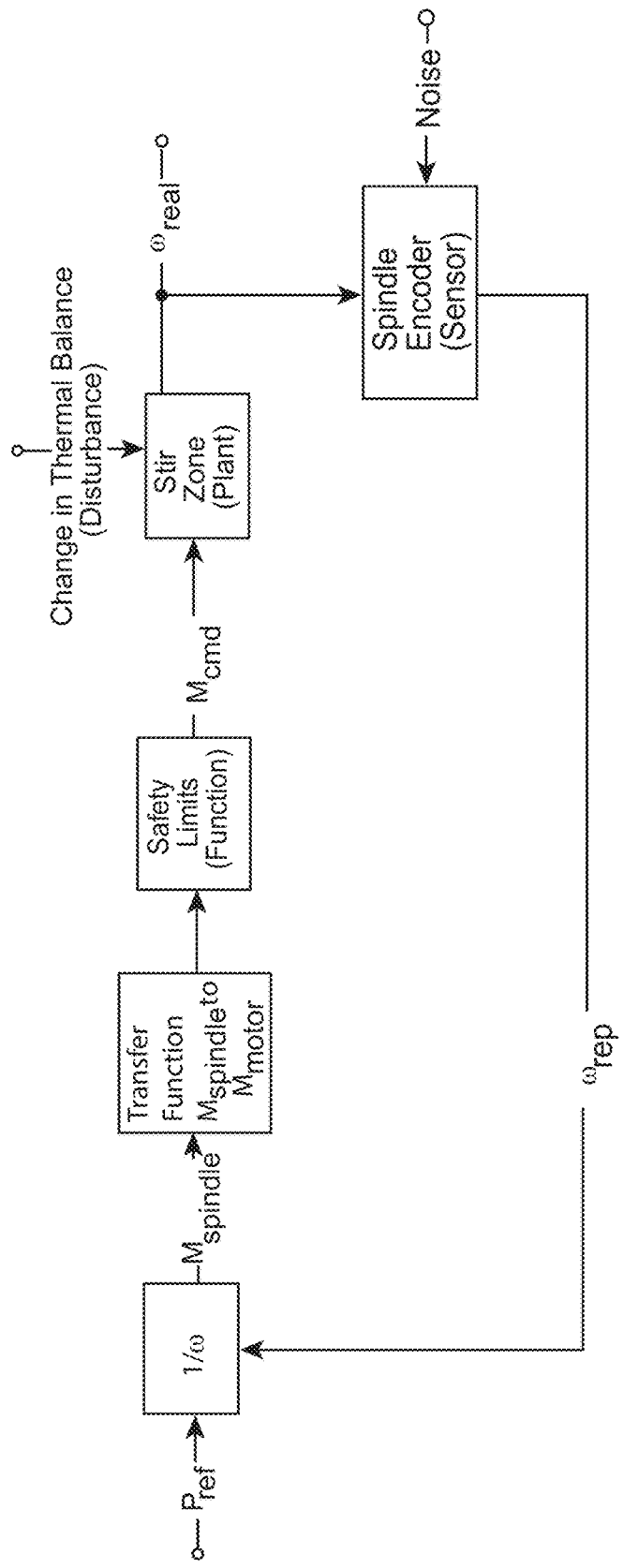
FIG. 8 is a block diagram of the inner loop of an active controller.

The present invention uses the relationship between torque (i.e. effort) and power as expressed in Equation (2) to control the FSW process. In this first embodiment, the spindle motor (i.e. driver) 710 is a variable frequency AC induction motor. Although an induction motor is shown, any appropriate driving mechanism may be used including mechanical, pneumatic, hydraulic, electric and magnetic drivers. When running under torque control with an induction motor, the motor interface control software commands and maintains a constant torque using flux vector control as directed by an active controller (not shown). The desired torque is obtained from the spindle motor by controlling the current fed to the induction motor. This control diagram is shown in FIG. 8.

It should be noted that torque (i.e. effort) control without spindle speed (i.e. flow) feedback is unstable. A constant torque can only be maintained for a short time. The torque can only be controlled when the load supports the torque. Torque that is greater than the natural process torque leads to greatly decreasing loads causing an exponential increase in spindle speed. This is because when spindle speed and torque are increasing, the power increases and the material softens. Conversely, if the torque is lower than the natural process torque, the spindle speed will decrease exponentially as the material cools and hardens. Process variation causes the commanded torque to be either too low or too high to maintain equilibrium causing the spindle to rapidly decelerate until it stops or accelerate until machine safety limits are triggered.

It has been determined that controlling power provided to a friction stir zone by adjusting torque (i.e. effort) in response to changes in spindle speed (i.e. flow) is a stable process. Torque increases in response to decreasing spindle speed to maintain a constant power. Torque decreases in response to increasing spindle speed to maintain a constant power.

Figure 9:
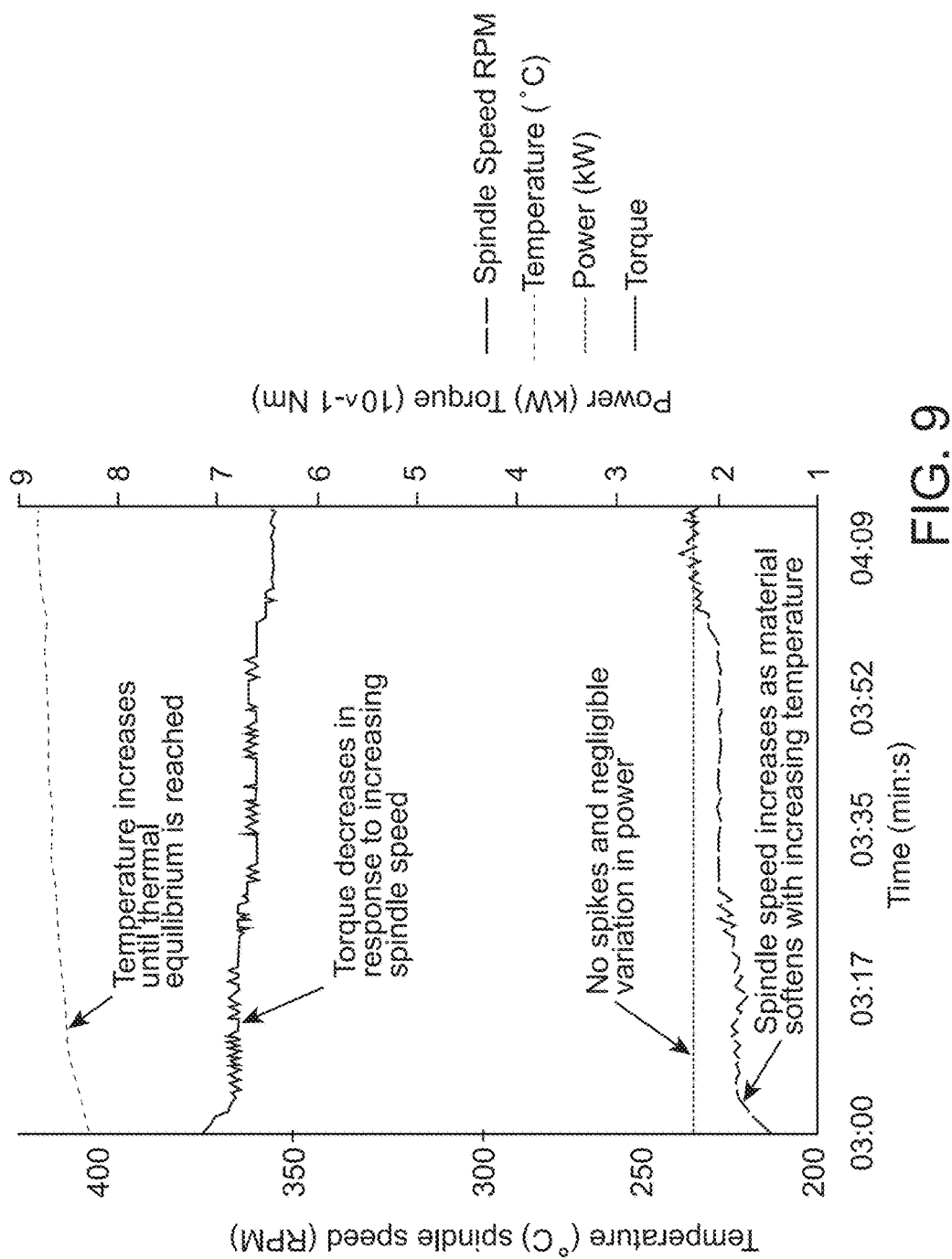
FIG. 9 is a graph showing the results when torque (i.e. effort) is adjusted to keep power constant.

FIG. 9 shows the results from a weld where torque (i.e. effort) is adjusted to maintain constant power. As the workpiece is heated, the material softens. The torque and RPM signals are mirror images of each other. The spindle speed increases as the material softens. The torque (i.e. effort) decreases with increasing spindle speed to maintain the constant power. FIG. 9 shows that power control achieved by torque control is a stable process.

Figure 10:
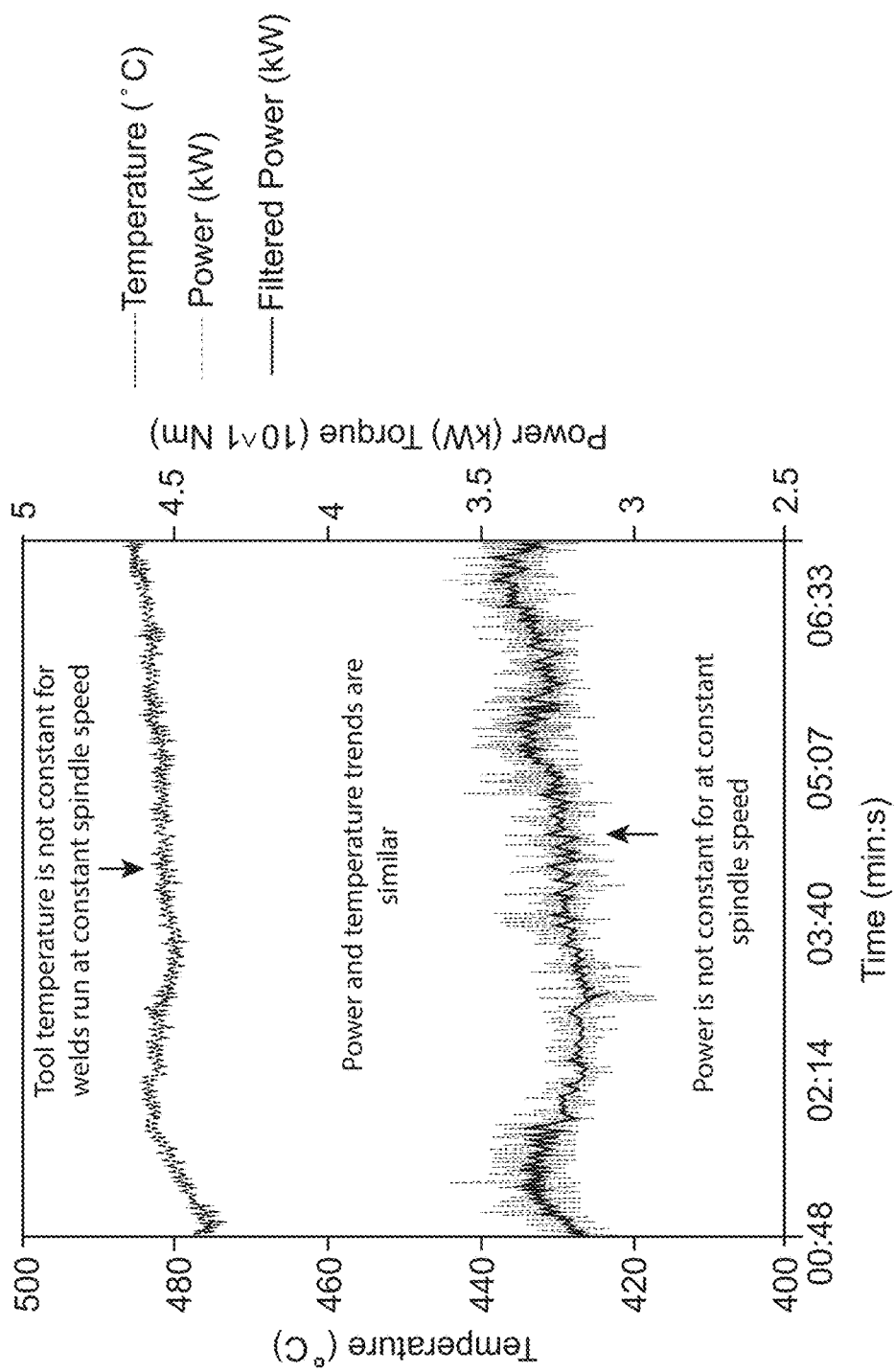
FIG. 10 is a graph showing that constant spindle speed welds contain variation in power and temperature.

FIG. 10 shows that constant spindle speed welds contain variation in power and temperature. The measured power contains power spikes that persist throughout the weld. The filtered power value varies throughout the weld in response the changes in the process.

Previously, it was shown in FIG. 6C that power control achieved by adjusting spindle speed results in a constant average power. However, the actual power contains torque spikes throughout the weld. The temperature response shows that the tool gradually rises in temperature until thermal equilibrium is reached and the temperature is constant.

FIG. 9 showed that power control achieved a torque (i.e. effort) control to maintain constant power produces a constant power with negligible variation. The temperature response is linear. This indicates that the tool is still heating and will reach a steady state-temperature.

Figure 11:
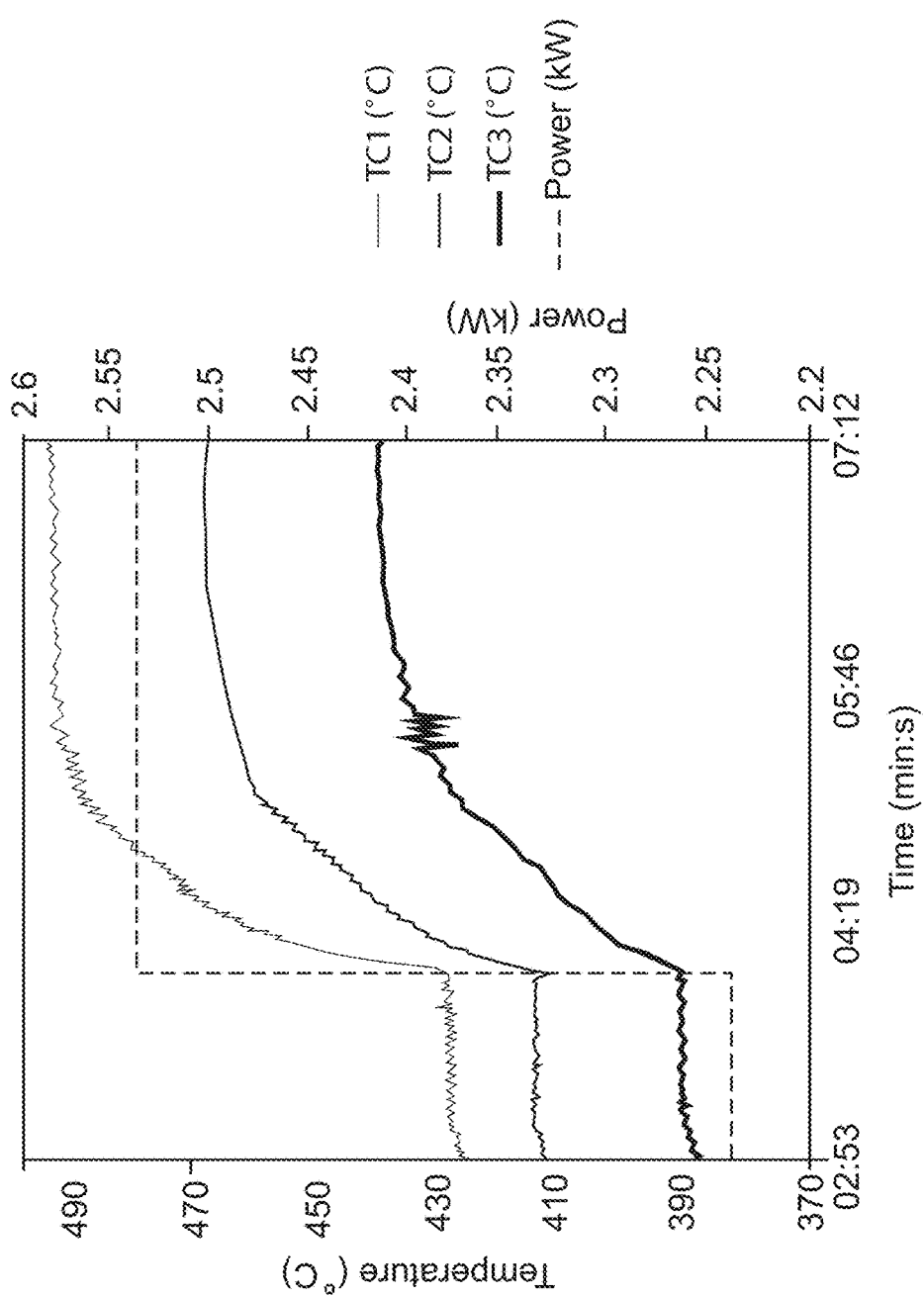
FIG. 11 is a graph of temperature response.

A demonstration of the principles of the present invention was performed and the results are shown in FIG. 11. A power control weld adjusting torque to keep power constant was run for 406.4 mm (16 in) at 2.238 kW then 609.6 mm (24 in) at 2.536 kW in AA 7075. The temperature response is shown in FIG. 11. Before the change in power is commanded, temperature is constant. After the change in power is commanded, the temperature increases logarithmically until a new steady-state temperature is reached. These results show that changes in power lead changes in temperature.

In the prior art when spindle speed is adjusted to control power, the commanded spindle speed is determined by the torque that is reported by the spindle controller. When torque is adjusted to control spindle speed, a command that is transmitted to control torque is sent to the spindle controller. The difference in resolution between reported and commanded torque affects the design of the power control loop.

Figure 12:
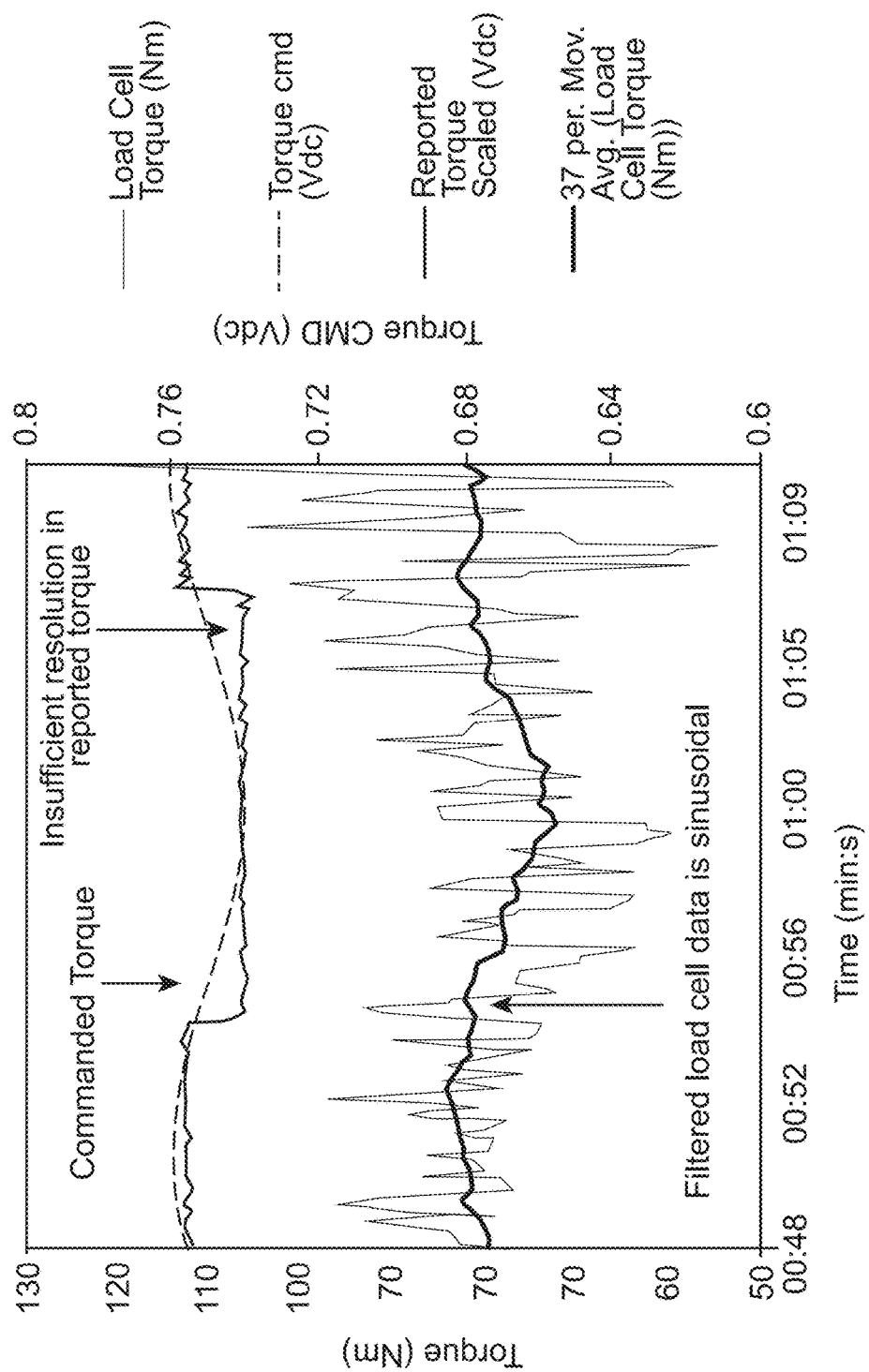
FIG. 12 is a graph showing that poor reported torque resolution results in unreported torque dynamics.

Torque measurements used in this embodiment are reported by the spindle motor controller. However, the reported torque fails to capture torque dynamics. FIG. 12 shows the torque reported by the controller and the torque calculated using load cells on the FSW machine in response to a sinusoidal torque command. The sinusoid is reported as a square wave due to limited resolution in reported torque.

The sinusoid can be seen in the torque calculated from forces measured by load cells. Torque calculated using load cells has poor signal quality due to cross talk. Because changes in torque during temperature and power control are small spindle torque will be assumed to be equal to commanded torque.

In developing the present invention, a dynamics analysis was performed to compare adjusting spindle speed and adjusting torque to maintain constant power. Returning to FIG. 7, M(mtr) is the motor torque, M(spn) is spindle torque, D(mtr) is the diameter of the motor pulley, D(spn) is the diameter of the spindle pulley, M(b) is torque lost due to bearings, ω(spn) is the rotational velocity of the spindle, and J is the mass moment of inertia of associated with the spindle. The gear ratio, R, is given by:

$$R = D(spn)/D(mtr) \qquad \text{Equation (3)}$$

and has a value of 2.5.

The relationship between torque and spindle speed is derived using FIG. 7 and is given by:

$$RM(mtr) = M(spn) + M(b) + J\omega(spn) \qquad \text{Equation (4)}$$

The effective motor torque, M(mtr_eff), is given by:

$$M(mtr\_eff) = RM(mtr) \qquad \text{Equation (5)}$$

Reported torque in experimental data is M(mtr_eff). Substituting Equation (4) into Equation (5) yields:

$$M(mtr\_eff) = M(spn) + M(b) + J\omega(spn) \qquad \text{Equation (6)}$$

Figure 13:
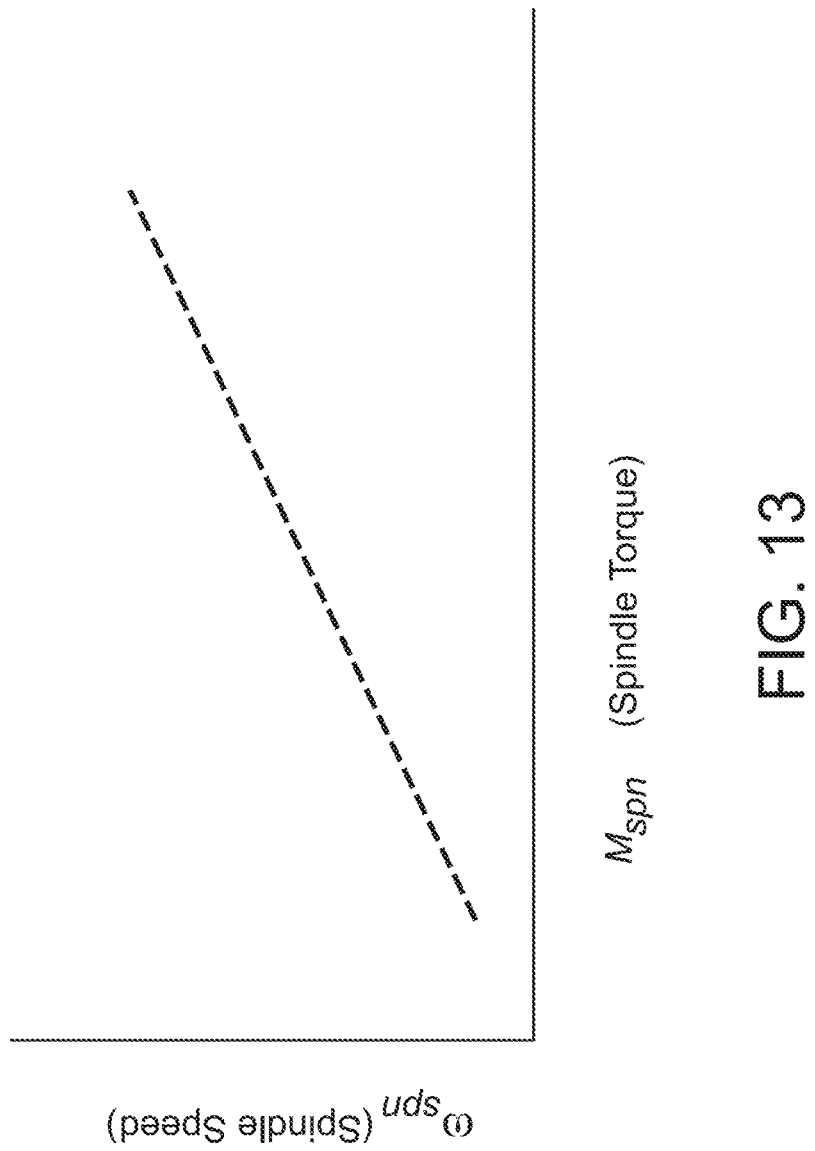
FIG. 13 is a graph showing linear torque-spindle speed assumption used for comparing spindle speed control to torque (i.e. effort) control.

For the purpose of comparing spindle speed control to torque control, it is assumed that ω(spn) and M(spn) have a linear relationship as shown in FIG. 13 and given by:

$$\omega(spn) = M(spn)/B \qquad \text{Equation (7)}$$

where it is assumed that J, M(b) and B are constant.

Figure 14A:
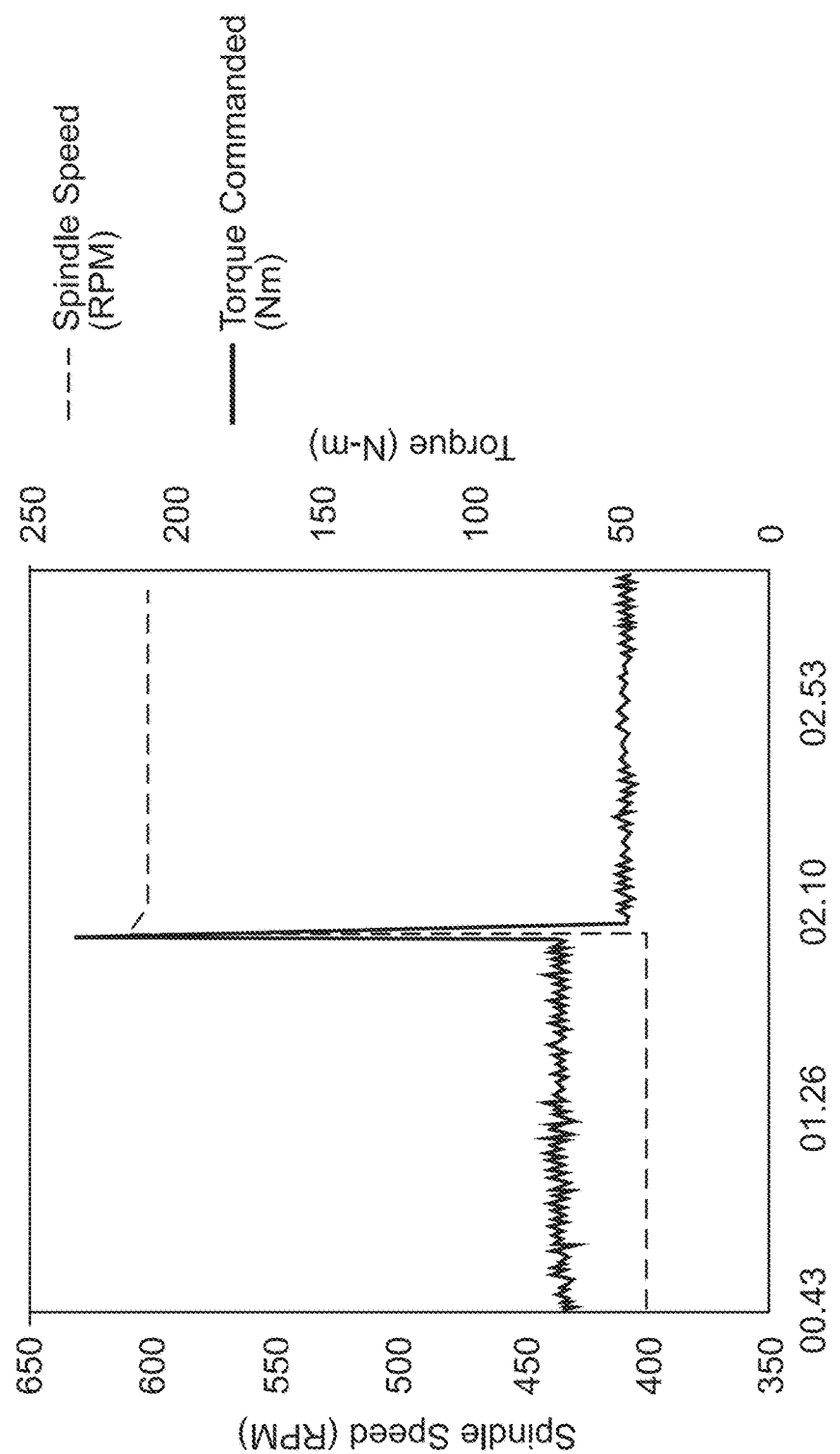
FIG. 14a is a graph showing a step increase in power adjusting spindle speed.

Because the spindle motor's maximum torque is finite, changes in commanded spindle speed result in large torque spikes, shown in FIG. 14a, in attempt to instantaneously accelerate the spindle to the desired rotational velocity.

The spindle speed response to a step change in effective motor torque was found to be exponential. However, the spindle speed response to changes in torque contains no discontinuities.

Experimental results for step changes in spindle speed and torque (i.e. effort) validate that torque (i.e. effort) has a derivative relationship with spindle speed, and spindle speed has an integral relationship with torque (i.e. effort). FIG. 14a shows the effective motor torque response to a step change in RPM. At the instant the change in desired spindle speed is made, the motor attempts to instantaneously accelerate the spindle in order to achieve the desired spindle speed. This results in a large spike in motor torque.

Figure 14B:
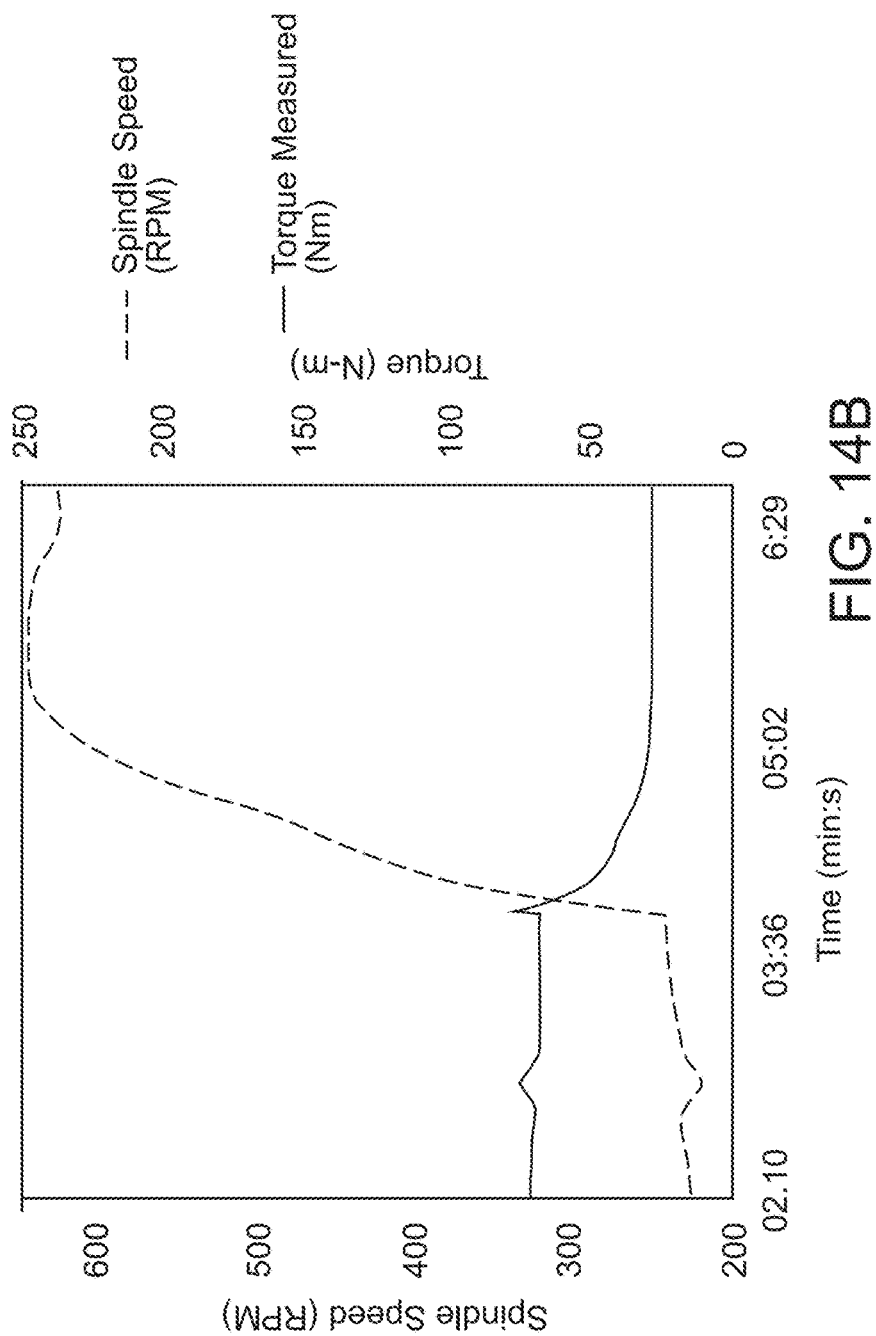
FIG. 14b is a graph showing a step increase in power adjusting torque.

FIG. 14b shows the spindle speed response to a step increase in power where power control was obtained by adjusting torque (i.e. effort). When the change in power is commanded, the torque instantly increases slightly to obtain the desired power value. Due to the increased power the material begins to soften causing the spindle speed (i.e. flow) to increase and the motor torque or effort to decrease. The spindle speed response to torque contains no discontinuities.

Experimental data shown in FIGS. 14a and 14b indicate that higher spindle speeds correspond to lower torques and lower spindle speeds correspond to higher torques. These results suggest that the slope shown in FIG. 13 should be negative.

The control methods presented assume M(mtr_eff) is approximately equal to M(spn). Torque (i.e. effort) has a derivative relationship with spindle speed (i.e. flow). When a change is RPM is commanded, the spindle motor attempts to instantaneously accelerate the spindle to a new RPM causing a spike in motor torque. A near instantaneous acceleration of the spindle motor would cause a large difference between motor torque and spindle torque. The motor torque is not approximately equal to spindle torque when a change in RPM is commanded.

Experimental data shows that when torque is adjusted to keep power constant, the difference between motor torque and spindle torque is much smaller than when spindle speed is used to keep power constant.

When a step change in power is commanded as shown in FIG. 14a, the torque error during the spindle spike is 203.0 Nm (149.7 ft-lb) which corresponds to a 406% error in power at the high power level and a 565% error at the low power level. In contrast, for power control by adjusting torque as shown in FIG. 14b, the error associated with the spindle acceleration after the change in power, where acceleration is greatest, is 7.4 Nm (5.46 ft-lb) which corresponds to 10% error in power.

Adjusting spindle speed to keep power constant is undesirable because reported torque is a poor control signal. Torque spikes cause the difference between motor and spindle torque to be as high or even higher than 400%. The reported torque signal has low resolution, adding to the error.

The main advantage of using torque to control power is the avoidance of artificial torque spikes caused by attempting to change the RPM instantaneously. Using torque control to control power results in a smooth power signal with low uncertainty. The difference between the motor torque and actual spindle torque is proportional to the acceleration of the spindle. Low uncertainty exists because under torque control, power and spindle speed change in a controlled fashion.

Figure 15:
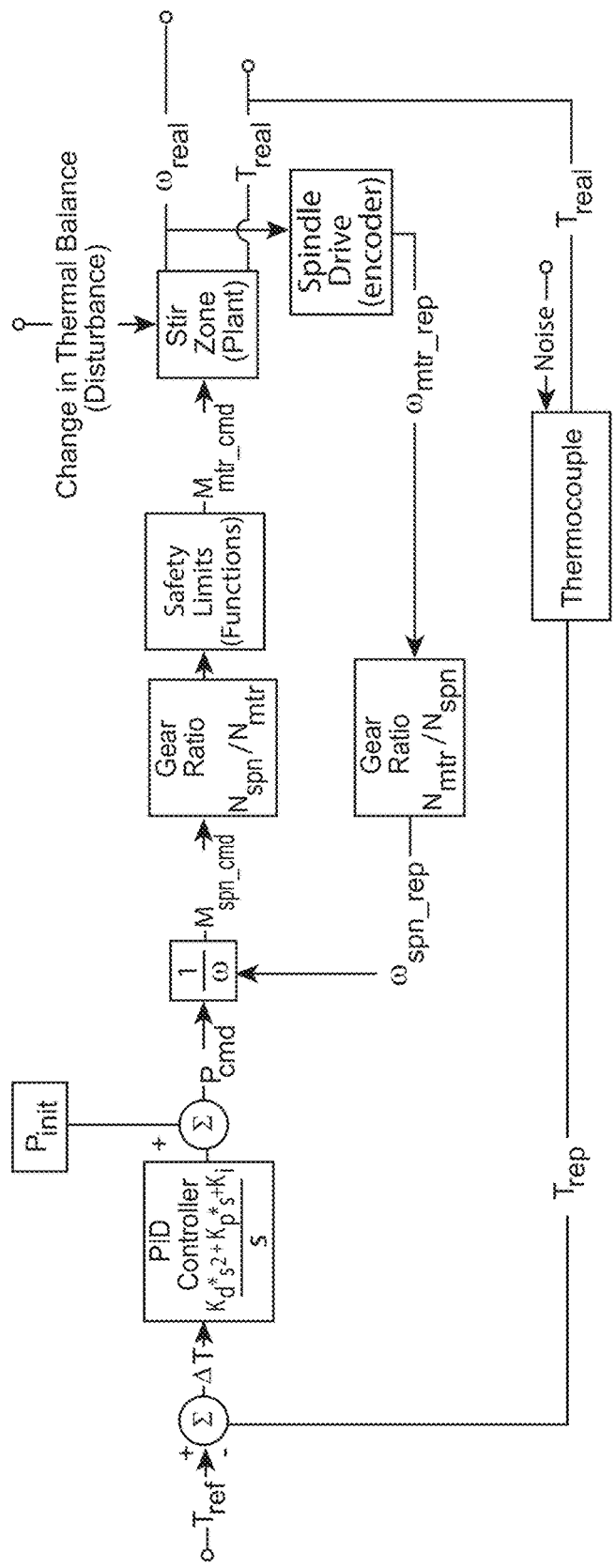
FIG. 15 is a block diagram showing the inner loop and the outer loop of an active controller.

Having addressed the inner control loop, attention is now directed to the outer control loop. FIG. 15 is a block diagram showing both the inner and outer loops of the first embodiment of the present invention. Proportional-integral-derivative (PID) controllers are the most commonly used type of closed-loop feedback controller. The outer loop uses PID control to adjust power to maintain a commanded temperature. The implementation of PID control in the outer loop is shown in FIG. 15. P(init) is a constant power value. The PID controller provides a change in power that is added to the P(init) term. The P(init) term is the spindle power at the moment the controller switches from commanding a constant spindle speed (i.e. flow) to temperature control. Once temperature control is engaged P(init) is constant until temperature control is disengaged.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method comprising:
   sensing a flow variable of a friction stir tool to a friction stir zone; and
   controlling, to a temperature setpoint and with an active controller, a temperature of the friction stir zone by adjusting a power provided by the friction stir tool to the friction stir zone,
   the controlling, to a power setpoint, the power provided by the friction stir tool to the friction stir zone being performed by controlling an output effort variable of a spindle driver that is used to drive the friction stir tool in response to the sensed flow variable feedback.

2. The method as defined in claim 1, wherein using the active controller to adjust power provided by the friction stir tool to a friction stir zone further comprises implementing a multi-stage nested control loop.

3. The method as defined in claim 2, wherein implementing the multi-stage nested control loop further comprises:
   1) implementing an inner control loop to thereby maintain the power through sensing the flow variable of the friction stir tool and control of the output effort variable of the spindle driver; and
   2) implementing an outer control loop that adjusts the power provided to thereby maintain the temperature for the friction stir zone.

4. The method as defined in claim 3, wherein controlling the output effort variable of the spindle driver further comprises controlling an input flow to the spindle driver.

5. The method as defined in claim 3, wherein controlling the output effort variable of the spindle driver further comprises controlling torque of the friction control tool.

6. The method as defined in claim 3, wherein controlling power provided by the friction stir tool to the friction stir zone comprises controlling the output effort variable of the spindle driver in response to changes in the flow variable of the friction stir tool, the flow variable comprising angular velocity of the friction stir tool.

7. The method as defined in claim 1, wherein controlling power provided by the friction stir tool to the friction stir zone comprises using spindle flow variable feedback, wherein power, the effort variable and the flow variable are related by the equation:

$$P=e*f,$$

wherein:
P is power provided by the friction stir tool to the friction stir zone;
e is the output effort variable of the spindle driver; and
f is the flow variable of the friction stir tool.

8. The method as defined in claim 7, wherein maintaining the power through control of the output effort of the spindle driver further comprises increasing the output effort variable of the spindle driver in response to a decrease in the spindle flow variable.

9. The method as defined in claim 7, wherein maintaining the power through control of the output effort of the spindle driver further comprises decreasing the output effort variable of the spindle driver in response to an increase in the spindle flow variable.

10. The method of claim 3, wherein adjusting the power provided to thereby maintain the temperature for the friction stir zone comprises adjusting a reference power level to the inner control loop.

11. A friction stir system comprised of:
a friction stir tool;
a spindle that is coupled to the friction stir tool;
a spindle driver that is coupled to the spindle to thereby cause the friction stir tool to rotate;
a sensor that senses a flow variable of the friction stir tool;
an active controller for controlling operation of the friction stir tool, wherein the active controller controls a temperature, to a temperature setpoint, of a friction stir zone by adjusting a power provided by the friction stir tool to the friction stir zone,
the active controller configured to control power, to a power setpoint, provided by the friction stir tool to the friction stir zone during friction stirring operations by controlling an output effort variable of the spindle driver that is used to drive the friction stir tool in response to the sensed flow variable feedback.

12. The system of claim 11 wherein using the active controller to adjust power provided by the friction stir tool to a friction stir zone further comprises implementing a multi-stage nested control loop.

13. The system of claim 12, wherein implementing the multi-stage nested control loop further comprises:
1) implementing an inner control loop to thereby maintain the power through sensing the flow variable of the friction stir tool and control of the output effort variable of the spindle driver; and
2) implementing an outer control loop that adjusts the power provided to thereby maintain the temperature for the friction stir zone.

14. The system of claim 13, wherein controlling the output effort variable of the spindle driver further comprises controlling an input flow to the spindle driver.

15. The system of claim 13, wherein controlling the output effort variable of the spindle driver further comprises controlling torque of the friction control tool.

16. The system of claim 13, wherein controlling power provided by the friction stir tool to the friction stir zone comprises controlling the output effort variable of the spindle driver in response to changes in the flow variable of the friction stir tool, the flow variable comprising angular velocity of the friction stir tool.

17. The system of claim 11, wherein controlling power provided by the friction stir tool to the friction stir zone comprises using spindle flow variable feedback, wherein power, the effort variable and the flow variable are related by the equation:

$$P=e*f,$$

wherein:
P is power provided by the friction stir tool to the friction stir zone;
e is the output effort variable of the spindle driver; and
f is the flow variable of the friction stir tool.

18. An active controller controlling operation of a friction stir tool to a friction stir zone, the active controller comprising:
an inner control loop that controls power, to a power setpoint, provided by the friction stir tool to the friction stir zone by using sensed angular velocity of the friction stir tool to control torque of a spindle driver of the friction control tool, wherein power, the torque and the angular velocity are related by the equation:

$$P=co*M,$$

wherein:
P is power provided by the friction stir tool to the friction control zone;
M is the torque of the spindle driver; and
co is the angular velocity of the friction stir tool; and
an outer control loop that maintain a desired temperature, to a temperature setpoint, for the friction stir zone by using a sensed temperature to adjust the power provided by the friction stir tool to the friction stir zone.

* * * * *